United States Patent Office 3,172,756
Patented Mar. 9, 1965

3,172,756
PROCESS OF DEPHOSPHORIZING PIG IRON
Erik Axel Bengtsson, Domnarvet, Sweden, assignor to Stora Kopparbergs Bergslags Aktiebolag, Falun, Sweden, a company of Sweden
No Drawing. Filed Apr. 4, 1962, Ser. No. 184,914
Claims priority, application Sweden Apr. 5, 1961
4 Claims. (Cl. 75—52)

The present invention refers to a process for dephosphorising pig iron without substantially lowering the carbon content thereof, i.e. to the conversion of a phosphorus containing pig iron to a pig iron of low phosphorus content which is directly useful as foundry pig iron or for an acid refining process.

For the refining of phosphorus containing pig iron to steel hitherto only the basic steel processes have been applicable. The refining to low phosphorus content then takes place only with a simultaneously occurring substantial oxidation of carbon. Thermodynamic calculations, it is true, indicate that dephosphorizing of molten pig iron without decreasing the carbon content should theoretically be possible at temperatures below about 1250° C., but the realization of such a process has thus far met with too great practical difficulties.

Several attempts have been made to develop commercially useful processes for this purpose. One of the best results in this regard seems to be the basic open-hearth process according to Hoesch, in which it is possible to get down to about 0.1% phosphorus at a maximum residual carbon content of 2%. Attempts with blowing oxygen from above and lime addition to the melt, under favourable conditions, have given approximately the same result. Endeavours have also been made to blow oxygen from above with simultaneous agitation by blowing through the melt. Hereby, it is true, the phosphorus content could be lowered to 0.03% at a carbon content of 1.5% but at carbon contents above 2% a phosphorus content below 0.1% could not be obtained. Also other methods to bring about a vigorous agitation have been suggested, for instance to use a rotary furnace or a shaking device known in the art, such as that disclosed in the U.S.A. Patent No. 2,875,036. Also with these devices it has turned out, however, that a lowering of the phosphorus content below 0.05% causes a lowering of the carbon content by more than 1%. When applying these methods for the production of foundry pig iron it has therefore been necessary after the treatment to subject the iron to carburization in order to obtain the desired carbon content.

It is an object of the invention to make possible a reduction of the phosphorus content of a pig iron rich in phosphorus to a value below 0.02% without lowering the carbon content below 3%.

According to the invention the dephosphorizing is carried out by supplying oxygen from above to the surface of the bath of the metal with a suitable basic slag in a container provided with a basic lining and mechanical means to bring about a vigorous agitation. At first the main part of the silicon and a part of the manganese are oxidized and eliminated from the molten pig iron by the basic slag. Already in this pre-refining a part of the phosphorus goes to the slag. However, dephosphorizing to low final phosphorus contents is considerably facilitated by the removal of the pre-refining slag, especially if the molten pig iron has a silicon content above approximately 0.4%. After removal of the pre-refining slag the main part of the phosphorus in the metal is removed by blowing with oxygen and agitation with basic slag rich in iron oxide from about 2 to about 5 minutes, for example. A suitable slag will be obtained from burnt lime, iron oxide, as in the form of iron ore concentrate or scale, and, if desired, fluorspar in the proportions:

25–50 parts of lime
25–50 parts of iron oxide
0–15 parts of fluorspar

It is important that the added solid slag formers readily form a molten slag and that the agitation in the container is adjusted in such a way that the phosphorus is oxidized and transferred to the slag without starting the carbon refining. The quick formation of fluid slag is brought about by blowing oxygen against the surface of the bath in such a manner that the gas does not substantially penetrate into the bath. By doing so iron is oxidized and the iron oxide forms a melt with the added solid slag formers at a relatively low temperature. If the oxygen lance is placed with its mouth 200 millimeters above the level of the bath while at rest, the volume velocity of the oxygen should not exceed 5 standard cubic meters per minute at a lance mouth opening of 26 millimeters. When the main part of the phosphorus has been oxidized the carbon refining becomes more and more vigorous which is indicated by a boiling activity of the bath in the container. This boiling is moderated by decreasing the degree of agitation and by slowing down the oxygen velocity. In this way dephosphorization in the final stage may be carried on to very low final percentages in the molten pig iron without appreciable lowering of the carbon content.

The dephosphorization according to the invention may be carried out in the temperature range of 1200–1500° C., preferably between 1250 and 1350° C.

In carrying the invention into practice a device should be used by which an intense and adjustable agitation can be performed and the slag can be quickly and effectively discharged. It has turned out, that a device according to Patent No. 2,875,036 referred to above is especially suitable for this purpose but it is also conceivable to arrange the agitation in another way. Rotary drum furnaces, on the other hand, have turned out to be less suitable due to the difficulty in readily and effectively discharging the slag in order to prevent the rephosphorization. In the operation of a device according to said Patent No. 2,875,036 at least the bottom portion of the container moves substantially horizontally repeatedly between given limits in a path about a substantially vertical axis without being moved about its own axis.

As examples of the application of the invention two experiments carried out in a ladle having a basic lining and in which the agitation is obtained with the aid of a shaking device according to Patent No. 2,875,036 referred to above. The amounts of slag formers and oxygen added as well as analysis and temperature of the iron during the experiment appear from the table below (concentrate being "iron oxide concentrate"):

| | Analysis of the pig iron | | | | Slag formers, kilograms per ton | | | Stand. cubic meter of O₂ per ton | Temperature, °C. |
|---|---|---|---|---|---|---|---|---|---|
| | C | Mn | Si | P | Lime | Concentrate | Spar | | |
| Run 1: | | | | | | | | | |
| Prior to treatment | 4.04 | 0.54 | 0.40 | 0.103 | | | | | 1,180 |
| Blowing and Slag addition | | | | | 20 | | | 9 | |
| After blowing | 3.80 | 0.34 | 0.08 | 0.079 | | | | | 1,310 |
| Dephosphorizing and Slag addition | | | | | 15 | 20 | 4 | 7 | |
| End product | 3.30 | 0.19 | | 0.015 | | | | | 1,270 |
| Run 2: | | | | | | | | | |
| Prior to treatment | 4.12 | 1.01 | 0.84 | 0.084 | | | | | 1,190 |
| Blowing and Slag addition | | | | | 24 | | | 11 | |
| After blowing | 4.10 | 0.66 | 0.31 | 0.081 | | | | | 1,450 |
| Dephosphorizing and Slag addition | | | | | 14 | 12 | 2 | 7 | |
| End product | 3.70 | 0.23 | 0.01 | 0.027 | | | | | 1,450 |

What is claimed is:
1. Process for dephosphorizing a melt of pig iron without significant decrease of the carbon content, comprising establishing in an upright container a melt of said pig iron, supplying basic slag forming material, including lime and iron oxide to the melt to form a molten dephosphorizing basic slag, said melt of pig iron and molten slag forming a bath, establishing a gas-filled space in said container above said bath, maintaining said bath at a temperature within the range from 1200° C. to 1500° C., moving at least the bottom portion of said container substantially horizontally repeatedly between given limits, so as to bring about a vigorous movement of said bath relative to said container while passing a stream of an oxidizing gas rich in oxygen from above into said gas-filled space above said bath without penetration of said stream into said bath, adjusting the oxidation thus brought about at least by adjusting the intensity of said vigorous movement of the bath until the phosphorus in the melt is oxidized and transferred to the slag, discontinuing said vigorous movement and said passing a stream of an oxidizing gas rich in oxygen shortly before said bath is clearly boiling and discharging the slag containing phosphorus thereby obtaining dephosphorized pig iron.

2. Process as claimed in claim 1, for dephosphorizing a melt of pig iron rich in silicon, comprising interrupting said vigorous movement and said passing a stream of an oxidizing gas rich in oxygen when the major part of silicon in the melt is oxidized and transferred to the slag, discharging the silicate slag formed, adding new quantities of slag forming material and then continuing the dephosphorizing treatment.

3. Process as claimed in claim 1, in which said container is moved in a path about a substantially vertical axis without being moved about its own axis.

4. Process as claimed in claim 1 in which the pig iron to start with contains about 0.1% phosphorus.

References Cited by the Examiner
UNITED STATES PATENTS 1,032,653  7/12  Brassert _____ 75—52
2,050,803  8/36  Perrin _____ 75—52
2,875,036  2/59  Kalling _____ 75—45
3,058,823  10/62 Churcher _____ 75—52

FOREIGN PATENTS 756,429  9/56  Great Britain.

DAVID L. RECK, *Primary Examiner.*
WINSTON A. DOUGLAS, *Examiner.*